UNITED STATES PATENT OFFICE.

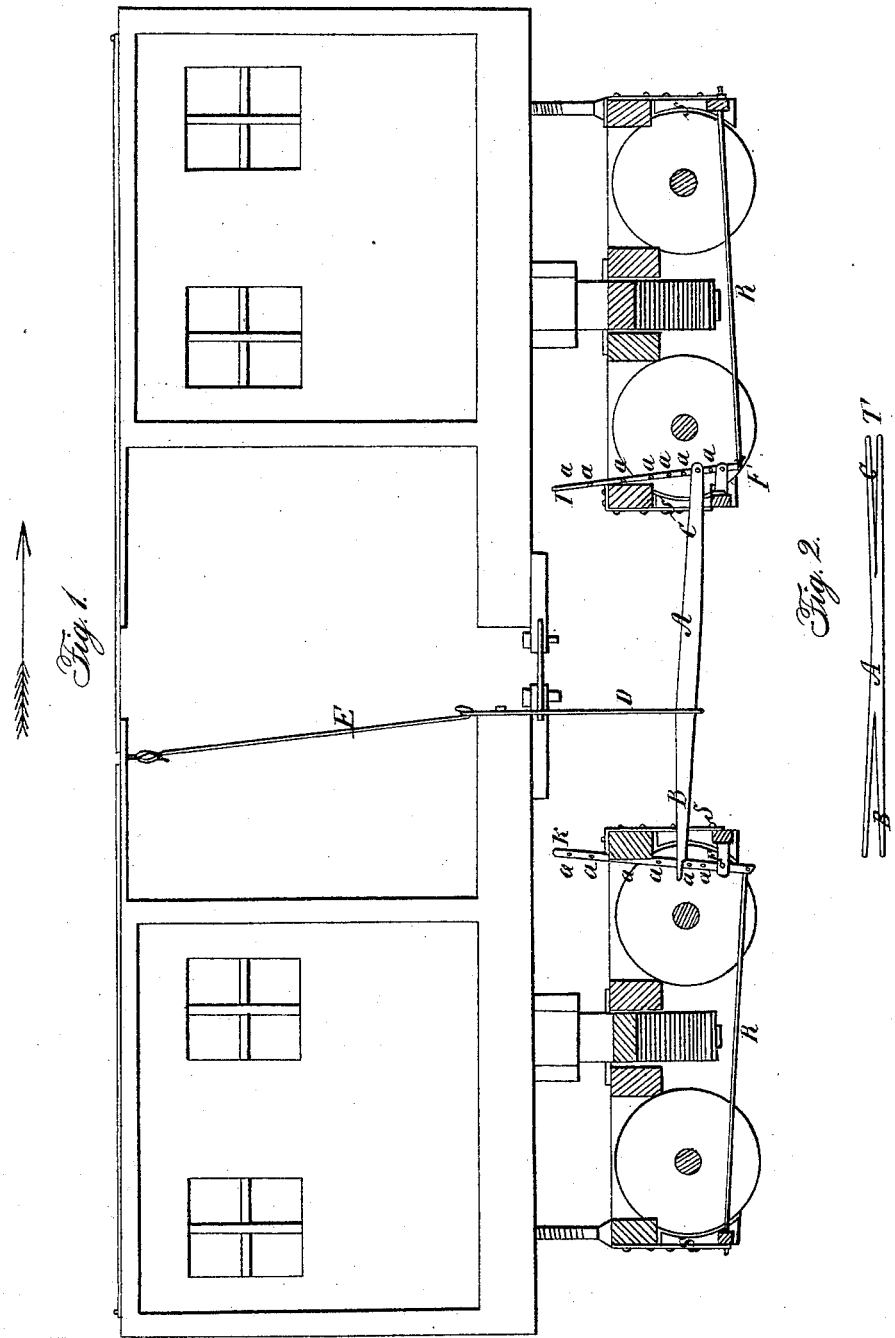

ENOCH B. TURNER, OF PROVIDENCE, RHODE ISLAND.

BRAKE FOR RAILROAD-CARS.

Specification of Letters Patent No. 27,486, dated March 13, 1860.

*To all whom it may concern:*

Be it known that I, ENOCH B. TURNER, of the city and county of Providence, in the State of Rhode Island, have invented a new and useful Safety-Brake for Railroad-Cars, which is fully described in the following specification, reference being had to the accompanying drawings, in which—

Figure 1, is a vertical longitudinal section of two railroad trucks with my improved brake applied; and Fig. 2, is a top view of the connecting bar A.

The rear and fore wheels in each truck of an eight wheel railroad car being provided with shoes S, a fulcrum F is placed on the inner side of the bar connecting the shoes attached to the rear wheels in the rear truck, and a similar fulcrum on the inner side of the bar connecting the shoes attached to the fore wheels in the fore truck of each car, In the fulcra F are affixed the levers (I, K) of the first class, their short arms extending downward and their long arms upward toward the bottom of the car. To the short arms of these levers are affixed rods R passing, in the rear set of wheels, to the bar or beam connecting the shoes on the fore wheels in the truck; and in the fore set of wheels, to the bar or beam connecting the shoes on the rear wheels in the truck, so that the shoes can be operated at the same time by the force applied to the long arms of the levers. All these parts are well known and now in use.

In the long arm of each lever, above the fulcrum, are placed, at suitable intervals, pins $a$, $a$, $a$, projecting on each side of the lever. The brakes are operated by a rod or bar A, connecting the lever or shoes in the rear set of wheels in the forward car, with the lever or shoes in the fore set of wheels in the rear car. This rod or bar may be solid, with a vertical slot T, of sufficient extent at each end; or it may be composed of two flat bars of iron, firmly connected by rivets, or otherwise, in the middle; or it may be a tube, by which lightness combined with strength, would be attained; the slots, above spoken of, being cut in the ends of the tube. At the end B, of the bar A, is a shoulder. At the end C, are eyelets. Upon one of the pins $a$ in the lever I upon the shoe S in the rear truck of the forward car, the end C of the bar A, is affixed by the eyelets, the end B having its shoulder resting against one of the pins in the lever K upon the shoes in the fore truck of the next car, when the brake is ready to be applied. If it is desired that the brake should not operate, it is prevented by raising the end B so that the bar A slides over the pin upon which the shoulder has rested, the shoulder in that case projecting beyond the pin. The pins in each lever to which the bar is affixed by the eyelets, or upon which it rests in the shoulder, are selected and regulated by the greater or less power required to be applied to the levers I, K.

The bar A being adjusted, when the progress of the train is arrested by the stopping of the engine, the applying the hand brake to the forward car, or any other mode, the second car rushes toward the forward car by the momentum already attained, and the levers are operated by the bar A and, in turn, act upon the shoes, and the revolution of the wheels is stopped. The same result is produced upon the remaining cars in the train in succession.

To place this brake under the control of the brakeman on each car, a stirrup D is hung upon the bumper or at some convenient place on the end of the car, by which the shoulder in the end B of the bar A is lifted from the pin in the lever, and the bar slides over the pin in the lever K as the cars come together, the brake not acting. If the brake is to be applied, the stirrup is again dropped letting the bar fall, and as the cars resume their regular distance, the shoulder falls again upon the pin as before.

To place this brake under the control of the engineer, conductor, or other officer, so that the brakes between all the cars may be operated by such officer from any point in the train, a cord E, is fastened to an eye in the top of the stirrup D, and connected with a cord extending along the top of the cars, the whole length of the train. When the officer wishes to relieve the cars from the brake, he pulls the cord and the bar is lifted in the stirrup as before. The relief of the cars from the brake is only needed when by the backing motion, the train is moved back. When the forward motion is to be resumed, the cord is loosened and the stirrup falls and with it the bar as before. The levers I, K, and the shoes, to which they are connected, may be operated by various other substantially equivalent modes: but I deem the mode described the most simple, economical, and convenient. When there is only one pair of shoes, and that upon the rear wheels in each rear truck, and one upon the fore wheels in each fore truck, the bar A, may be applied directly to the bar or beam connecting the shoes upon each pair of wheels referred to, and then, as the cars come together, these shoes would be brought against the wheels, and arrest their revolution.

I disclaim the use of the cord extending through the train for the purpose of acting on the brakes, generally, such a cord being already in use for a similar purpose.

What I claim, as my invention, and desire to secure by Letters Patent, is,

1. The simultaneous operation by the momentum of the train of the brakes upon the shoes on the wheels in two or more railroad cars through the action of the bar A, connected with the shoes in the manner substantially as described.

2. I also claim the stirrup D, and its combination with the cords described, one extending through the train and the other connecting that cord with the stirrup, substantially as described for the purpose before set forth.

Providence January 26, 1860.

ENOCH B. TURNER.

Witnesses:
JOSEPH L. PITMAN,
SAMUEL D. TURNER.